Figure 1:
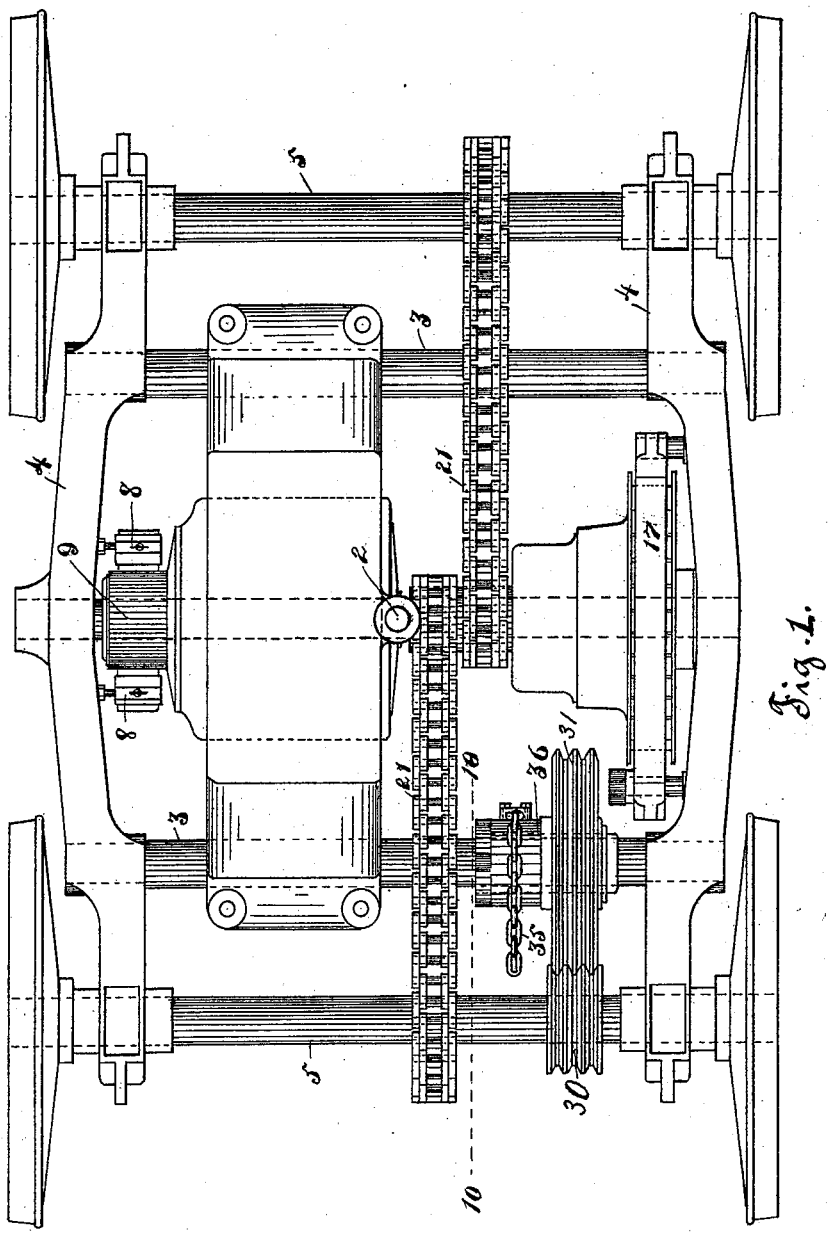

(No Model.)

J. C. HENRY.
ELECTRIC CAR TRUCK.

No. 494,479. Patented Mar. 28, 1893.

2 Sheets—Sheet 1.

Witnesses:
Geo. H. Knight Jr.
M. C. Bidgood

Inventor:
John C. Henry
By Knight Bros
Attys

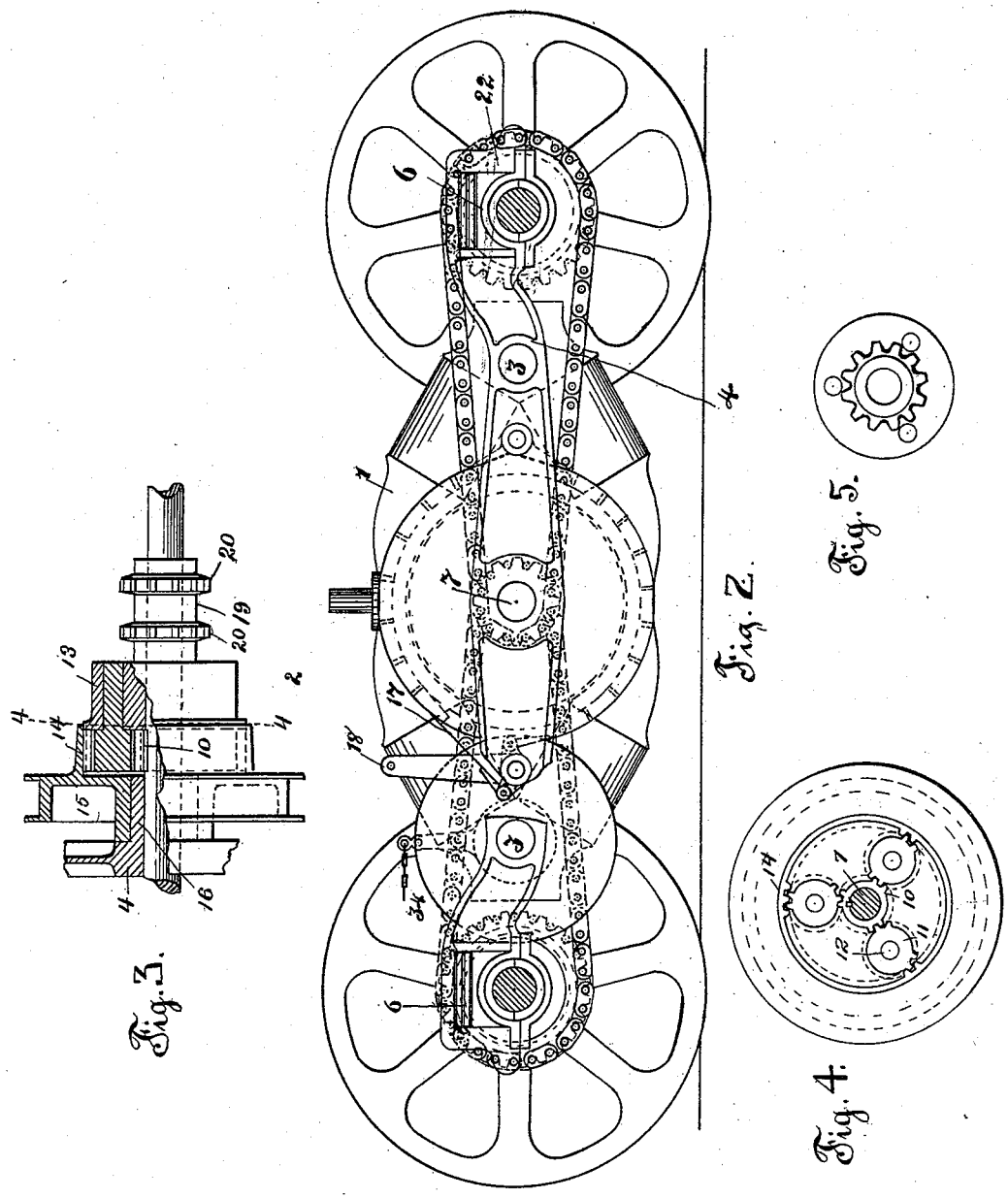

UNITED STATES PATENT OFFICE.

JOHN C. HENRY, OF NEW YORK, N. Y.

ELECTRIC-CAR TRUCK.

SPECIFICATION forming part of Letters Patent No. 494,479, dated March 28, 1893.

Application filed January 2, 1892. Serial No. 416,838. (No model.)

*To all whom it may concern:*

Be it known that I, JOHN C. HENRY, a citizen of the United States, residing in the city, county, and State of New York, have invented certain new and useful Improvements in Electric-Car Trucks, of which the following is a specification.

This invention relates to certain improvements in power transmitting and braking devices for electric cars, and is here shown applied to a swivel truck for such a car.

In the accompanying drawings, Figure 1 is a plan, and Fig. 2 a side elevation of an electric car truck embodying my improvements. Fig. 3 is a partly sectional view of the differential speed reducing mechanism. Fig. 4 is a sectional view of such mechanism in a plane indicated by the line 4, 4, Fig. 3. Fig. 5 is an end view of a part of the gearing taken on the right side of Fig. 3.

1, 1, are the field magnets of a motor supporting a king or center pin at 2, for the car-body, and itself carried by cross-bars 3, 3, which with the side-bars 4, 4, form the truck frame. The side-bars 4, 4, may have rigid bearings in which the car-axles 5, 5, run, or as shown in Fig. 2, may be supported from such bearings by springs 6, 6. The armature shaft 7 of the motor has bearings at both ends in the side-bars 4, 4, of the frame. On one side of the truck the brush holders 8, 8, are carried by the truck frame and are insulated therefrom and arranged in connection with the commutator 9. On the other side of the truck I arrange the mechanism for transmitting power from the armature shaft to the car-axles.

Referring now more especially to Figs. 1 to 5 inclusive: I have herein illustrated a form of differential gear which is in some respects the same as that described in my application for Letters Patent, Serial No. 325,244, filed on the 27th of September, 1889. The armature shaft 7 has keyed to it a pinion 10 which engages two or three intermediate pinions 11 mounted on, or formed with, pins or trunnions 12, which are adapted to be supported by and run loosely in a disk 13, mounted loosely on the shaft 7. Exteriorly the intermediate pinions 11 engage an internal gear 14 which is formed on a flange of a band wheel 15, which runs on the shaft 7, or as here shown, on an annular projection 16 from one of the side-bars 4, which forms a part of the bearing in said side-bar of one end of the shaft 7. On the wheel 15 is a band-brake 17, (see Fig. 2,) adapted to be clamped or released by a lever 18 which may have means of operation from either or both of the car platforms. At the other side of this transmitting mechanism the disk 13 has integral with it a sleeve 19, to which are keyed sprocket-wheels 20, for drive-chains 21, which have similar but preferably larger sprocket wheels 22 on the car-axles.

The operation is as follows: The armature runs constantly and drives constantly the pinion 10 and the intermediate pinions 11. So long as the brake 17 is released, the internal gear 14 is free to move and is driven by the pinions 10, 11, so that while the intermediate pinions 11 turn freely on their pins or trunnions 12, they do not revolve in planetary fashion around the armature shaft 7; but if the brake 17 be tightly clamped so as to entirely arrest the movement of the internal gear 14, the intermediate pinions continuing their rotation will travel around in the internal gear and around the armature shaft in planetary fashion carrying with them the disk 13 and sprocket wheels 20, and so driving the chains 21 and car-axles. Any intermediate speed between rest and one corresponding to the maximum speed of the car may be obtained by a corresponding relaxation of the grip band 17 on its wheel 15, permitting the said wheel to slip more or less under the action of the pinions 10, 11.

Having thus described my invention, the following is what I claim as new therein, and desire to secure by Letters Patent:

1. The combination of the axles 5, longitudinal bars 4 carried thereby, the electric motor mounted on said longitudinal bars having its armature shaft bearing therein at both ends, the speed-reducing gear surrounding said armature shaft and having sprocket wheels and sprocket chains and wheels connecting the said gear to the car axles.

2. The combination in an electric car of the motor, the differential speed-reducing gear comprising pinion 10, intermediate pinions 11, internal gear 14, means of arresting said internal gear, disk 13 whereon said intermediate pinions are mounted, and sprocket wheels 20 connected to said disk 13; and chain and sprocket connection from said sprocket wheels to the car axles.

3. The combination of the car truck, the electric motor thereon and the differential speed reducing gear, the car truck having a projection 16 whereon one member of said gear rotates.

4. The combination in an electric car of the longitudinal truck bar 4, having tubular projection 16, the electric motor having shaft 7 and pinion 10, the intermediate pinions and their supporting and power transmitting mechanism, and the internal gear 14 having braking devices and mounted so as to revolve on said projection 16.

JOHN C. HENRY.

Witnesses:
HARRY E. KNIGHT,
GEO. H. KNIGHT, Jr.